US008587152B2

(12) United States Patent
Martinelli (10) Patent No.: US 8,587,152 B2
(45) Date of Patent: Nov. 19, 2013

(54) SEQUENTIAL SHUNT REGULATOR WITH ANALOG FILL CONTROL

(75) Inventor: Robert Matthew Martinelli, Murrieta, CA (US)

(73) Assignee: The Boeing Company, Chicago, IL (US)

(*) Notice: Subject to any disclaimer, the term of this patent is extended or adjusted under 35 U.S.C. 154(b) by 140 days.

(21) Appl. No.: 13/072,769

(22) Filed: Mar. 27, 2011

(65) Prior Publication Data

US 2012/0242154 A1 Sep. 27, 2012

(51) Int. Cl.
*H02J 1/00* (2006.01)

(52) U.S. Cl.
USPC ............... 307/80; 307/59; 307/66; 307/77; 307/82; 307/87; 323/222; 323/282; 323/284; 323/286

(58) Field of Classification Search
USPC ............ 307/59, 66, 77, 80, 82, 87; 323/222, 323/282, 284, 285
See application file for complete search history.

(56) References Cited

U.S. PATENT DOCUMENTS

| 3,696,286 A | 10/1972 | Ule |
| 3,896,368 A | 7/1975 | Rym |
| 4,186,336 A | 1/1980 | Weinberg et al. |
| 6,979,986 B2 | 12/2005 | Liegeois |
| 7,777,367 B2* | 8/2010 | Choy et al. ................. 307/60 |
| 2011/0031925 A1* | 2/2011 | Simburger et al. ........... 320/101 |
| 2011/0127972 A1* | 6/2011 | Busto Llavona et al. ..... 323/222 |

FOREIGN PATENT DOCUMENTS

FR EP2267572 A1 12/2012

OTHER PUBLICATIONS

Extended European Search Report, European Patent Office, EP 12 16 1566, Jul. 24, 2012.

* cited by examiner

*Primary Examiner* — Rexford Barnie
*Assistant Examiner* — Toan Vu
(74) *Attorney, Agent, or Firm* — Ameh IP; Lowell Campbell; Elahe Toosi (57) ABSTRACT

A sequential shunt regulator switch system and method is disclosed. A power switch is controlled to switch a first current from a power source to an electrical bus. Further, a current controllable switch provides a controlled current from the power source to the electrical bus.

20 Claims, 5 Drawing Sheets

SEQUENTIAL SHUNT REGULATOR WITH ANALOG FILL CONTROL

GOVERNMENT RIGHTS

This invention was made with Government support under HR0011-08-C-0086 P00003 awarded by Defense Advanced Research Projects Agency. The government has certain rights in this invention.

FIELD

Embodiments of the present disclosure relate generally to electrical systems. More particularly, embodiments of the present disclosure relate to regulated electrical systems.

BACKGROUND

Some electrical power systems comprise a plurality of power sources working in combination to provide power. For example, in spacecraft and satellite applications, power from a bank of solar panels must be matched to a load or shunted to ground. As the load changes, an amount of power shunted to ground may change.

SUMMARY

A Pulse Width Modulation (PWM) controlled sequential shunt regulator switch system and method is disclosed. A power switch is controlled to switch a first current from a power source to an electrical bus. Further, a current controllable switch provides a controlled current from the power source to the electrical bus.

In an embodiment, a sequential shunt regulator comprises a power switch operable to switch a current from a power source to an electrical bus. Further, a current controllable switch is operable to provide a controlled current from the power source to the electrical bus, and a controller is operable to control the power switch and the current controllable switch.

In another embodiment, a sequential shunt regulation method controls a power switch to switch a first current from a power source to an electrical bus. The method further controls a current controllable switch operable to provide a controlled current from the power source to the electrical bus.

In yet another embodiment, a method for regulating an electrical system using a sequential shunt regulator with analog fill control receives currents from one or more current sources. The method further switches a first subset of the currents in discrete amounts to provide a first current to an electrical bus, and provides a second subset of the currents in analog amounts to provide a second current to the electrical bus. The method also controls the discrete amounts and the analog amounts to substantially match the first current plus the second current to a load on the electrical bus.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to power switches, analog and digital circuit design, and other functional aspects of the systems (and the individual operating components of the systems) may not be described in detail herein. In addition, those skilled in the art will appreciate that embodiments of the present disclosure may be practiced in conjunction with a variety of hardware and software, and that the embodiments described herein are merely example embodiments of the disclosure.

Embodiments of the disclosure are described herein in the context of a practical non-limiting application, namely, voltage regulation on a manned and unmanned spacecraft or satellite electrical bus. Embodiments of the disclosure, however, are not limited to such spacecraft or satellite applications, and the techniques described herein may also be utilized in other applications. For example but without limitation, embodiments may be applicable to manned and unmanned aircraft, ships, automobiles, buildings, trains, submarines, various voltage conversion applications and circuits, and the like.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Embodiments of the disclosure provide a circuit for a regulated bus system operating a number of power sources such as solar array strings or other power sources to deliver a current to substantially match a load current drawn by a load on the regulated bus system. A first subset of the power sources are sequentially coupled (e.g., all current or no current) to an electrical bus as a function of the load current. A second subset of the power sources are controlled in an analog fashion to supply an analog current providing a difference between the sequentially coupled power sources capability and the load current. In this manner, a current provided by the power sources is substantially matched to the load current.

Figure 1:
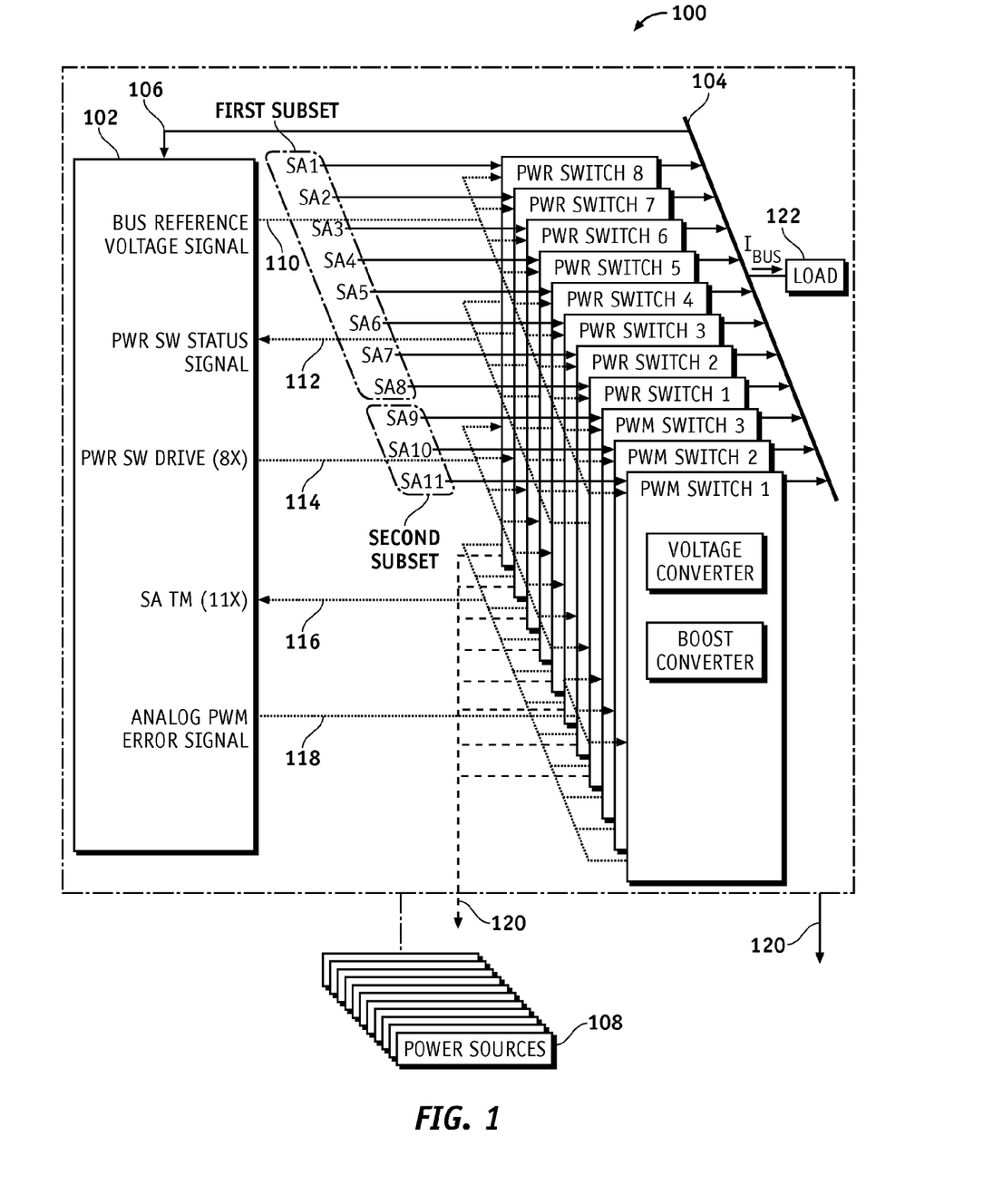
FIG. 1 is an illustration of an exemplary PWM controlled sequential shunt regulator showing a power switch bank and a controller according to an embodiment of the disclosure.

FIG. 1 is an illustration of an exemplary PWM sequential shunt regulator (system 100) showing a power switch bank and a controller according to an embodiment of the disclosure. The system 100 comprises a controller 102, an electrical bus 104, a power switch bank such as a plurality of power switches (PWR switch 1-8), a plurality of coupling lines (SA1-SA8) coupling the power switches (PWR switch 1-8) to a plurality of power sources 108, a plurality of PWM controlled switches 1-3, a plurality of coupling lines (SA9-SA11) coupling the PWM controlled switches 1-3 to the plurality of power sources 108, and a load 122. Although 8 PWR switches, 3 PWM controlled switches, and 11 coupling lines are used in the embodiment shown in FIG. 1, any number of switches and coupling lines suitable for operation of system 100 may also be used. In this document, power sources and current sources may be used interchangeably.

The controller 102 receives a bus voltage signal 106, a PWR switch (SW) status signal 112 (status signal of power switches), and a power source telemetry (SA TM) signal 116. The bus voltage signal 106 is compared to a bus reference voltage signal 110, and a voltage error signal such as a voltage error signal 202 (FIG. 2) comprising a difference between the bus voltage signal 106 and the bus reference voltage signal 110 is computed. The bus reference voltage signal 110 represents a desired voltage for the electrical bus 104 and may be generated by, for example but without limitation, a calibrated voltage source, a controlled voltage source, a controlled voltage source set by the controller 102, and the like.

Figure 2:
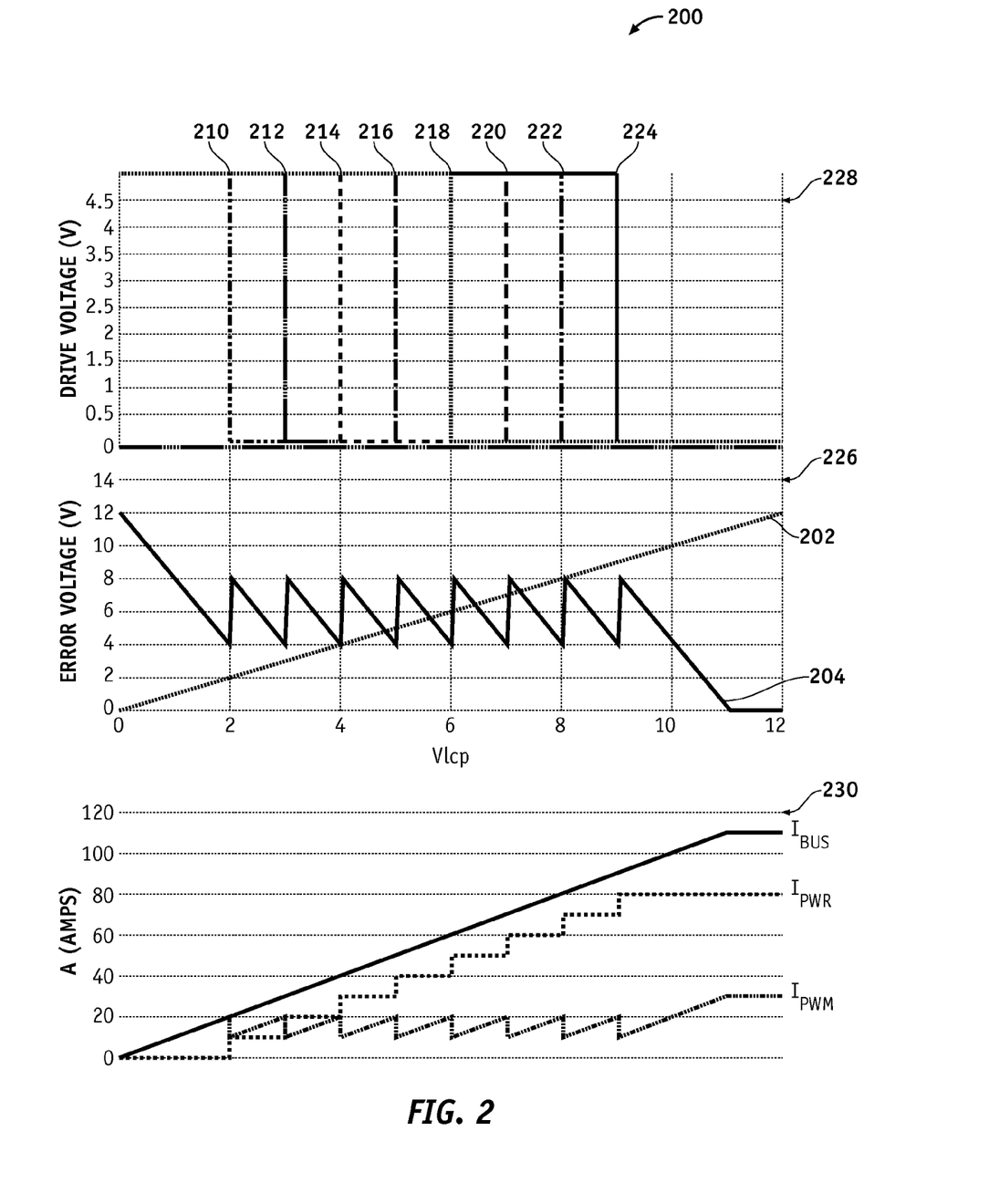
FIG. 2 is an illustration of an exemplary graph showing operation of the power switch bank and the controller of FIG. 1 according to an embodiment of the disclosure.

The voltage error signal 202 may be an output voltage of an error amplifier (not shown) of the controller 102, and may be proportional to a bus current $I_{BUS}$ delivered to the electrical bus 104. When the bus voltage signal 106 is lower than the bus reference voltage signal 110, the voltage error signal 202 increases. In response to an increase in the voltage error signal 202, the controller 102 causes the bus current $I_{BUS}$ to be delivered to the load 122 at a current that is greater than or equal to the load current. When the bus voltage signal 106 is higher than the bus reference voltage signal 110, the voltage error signal 202 decreases. In response to a decrease in the voltage error signal 202, the controller 102 causes the bus current $I_{BUS}$ to be delivered to the electrical bus 104 at a current that is less than or equal to the load current. In this manner, the bus current $I_{BUS}$ is substantially matched to the load current, and the bus voltage signal 106 is substantially matched to the bus reference voltage signal 110.

The controller 102 may further compare the voltage error signal 202 to a sequence of voltage thresholds, and direct a PWR switch control module 310 (FIG. 3) to sequentially activate PWR switches 1-8 until the bus current $I_{BUS}$ delivered to the electrical bus 104 substantially matches the load current. When the voltage error signal 202 reaches a steady state, the voltage error signal 202 may substantially equal a voltage that produces the bus current $I_{BUS}$ at a current that substantially matches the load current. The controller 102 controls and drives the PWR switches 1-8 via the PWR SW drive 114.

The controller 102 monitors the PWR SW status signal 112 of the PWR switches 1-8 and generates an analog PWM error signal 118 which is proportional to a current delivered from the power sources 108 to the electrical bus 104. In this manner, the PWR SW status signal 112 is subtracted from the voltage error signal 202 to produce the analog PWM error signal 118. The analog PWM error signal 118 controls an amount of current delivered from the power sources 108 by the PWM controlled switches 1-3 to deliver a current from at least one of the power sources 108 to substantially match the load 122 on the electrical bus 104.

Each time one of the power sources 108 is coupled to the electrical bus 104, or decoupled from the electrical bus 104 and shunted to ground 120 by the PWR switch control module 310, the analog PWM error signal 118 sent to the PWM controlled switches 1-3 may need to be re-centered. The analog PWM error signal 118 is re-centered to control the PWM controlled switches 1-3 to deliver a current required to substantially match the load 122 on the electrical bus 104.

The electrical bus 104 may comprise, for example but without limitation, a spacecraft power bus, a satellite power bus, a ship electrical bus, an automobile electrical bus, a power grid electrical bus, a battery bus, a manned and unmanned spacecraft bus, a manned and unmanned aircraft bus, a building bus, a train bus, a submarine bus, various voltage conversion applications and circuits, and the like.

The PWM controlled switches 1-3 are current controllable switches comprising a first PWM switch (PWM switch 1), a second PWM switch (PWM switch 2), and a third PWM switch (PWM switch 3). Each of the PWM controlled switches 1-3 is operable to provide power from the power sources 108 to the electrical bus 104 at a controlled current and/or a controlled voltage as explained in more detail below. The PWM controlled switches 1-3 may comprise, for example but without limitation, a controllable voltage converter, a controllable boost converter, a controllable buck converter, at least one controllable voltage converter comprising at least one controllable boost converter, and the like.

The power switches (PWR switch 1-8) are operable to couple the power sources 108 to the electrical bus 104 via coupling lines (SA1-SA8). At discrete levels substantially proportional to the bus current $I_{BUS}$ of the electrical bus 104, comparators such as a voltage threshold module 308 (FIG. 3) of the controller 102 change state to increase or decrease a number of the power sources 108 coupled via the coupling lines SA1-SA8 to the electrical bus 104. In this manner, the PWR SW status signal 112 changes to indicate a number of the power sources 108 that are coupled to the electrical bus 104.

The power sources 108 may comprise, for example but without limitation, solar panels, solar array strings, fuels cells, batteries, generators, satellite power sources, spacecraft power sources, aircraft power sources, shipboard generators, train power sources, solar and engine powered long-duration aircraft and spacecraft (manned and unmanned) power sources, a super-heated thermal couple from a reactor, and the like.

The load 122 may comprise, for example but without limitation, an electronic device, a motor, a heater, a power distribution system, an appliance, an additional electrical bus, and the like. The load 122 may be coupled to the power sources 108 via the electrical bus 104.

FIG. 2 is an illustration of an exemplary graph (graph 200) showing operation of the power switches (PWR switch 1-8), and the controller 102 of FIG. 1 according to an embodiment of the disclosure. The graph 200 shows a first plot 226, a second plot 228, and a third plot 230.

The first plot 226 shows a relationship between error voltages represented by the voltage error signal 202 and a PWM error voltage signal 204 (analog PWM error signal 118 in FIG. 1) as a function of a load current proportional voltage Vlcp. The load current proportional voltage Vlcp may be, for example, a voltage proportional to a load current of the load 122. The bus current $I_{BUS}$ comprises a total current delivered to the electrical bus 104 from the PWR switches 1-8 and the PWM controlled switches 1-3. The load current proportional voltage Vlcp may be, for example but without limitation, a signal that is 0.1 times the bus current $I_{BUS}$. The voltage error signal 202 is proportional to the bus current $I_{BUS}$. Therefore, as shown in FIG. 2, for example, as the voltage error signal 202 increases from 0 to 11V, the bus current $I_{BUS}$ increases from 0 to 110 A.

The PWM error voltage signal 204 is proportional to a combined PWM current $I_{PWM}$ delivered to the electrical bus 104 by the PWM controlled switches 1-3. For example, as shown in FIG. 2, the PWM error voltage signal 204 may be active in a range of 12V to 2V such that as the PWM error voltage signal 204 decreases from 12V to 0V, the combined PWM current $I_{PWM}$ increases from 0 A to 30 A.

The second plot 228 shows drive voltages 210-224 generated by respective drive lines of the PWR SW drive 114 of each of the PWR switches 1-8 as a function of the load current proportional voltage Vlcp.

The third plot 230 shows a relationship between a combined PWR current $I_{PWR}$, the combined PWM current $I_{PWM}$, and the bus current $I_{BUS}$ as a function of the load current proportional voltage Vlcp. The combined PWR current $I_{PWR}$ is provided by the PWR switches 1-8 from the powers sources 108, the combined PWM current $I_{PWM}$ is provided by the PWM controlled switches 1-3 from the powers sources 108, and the bus current $I_{BUS}$ is a sum of the combined PWR current $I_{PWR}$ and the combined PWM current $I_{PWM}$.

The second plot 228 together with the first plot 226 and the third plot 230 show a relationship between the voltage error signal 202, the PWM error voltage signal 204, and the drive voltages 210-224 of each of the PWR switches 1-8 generated by respective drive lines of the PWR SW drive 114 as a function of the load current proportional voltage Vlcp. For example, when the bus current $I_{BUS}$ (FIG. 1) reaches 20 A, a first PWR switch 1 turns off as indicated by a drive voltage 210 for the first PWR switch 1 changing to 0V and the first PWR switch 1 delivers 10 A to the electrical bus 104. When the drive voltage 210 for the first PWR switch 1 changes to 0V, the PWM error voltage signal 204 is substantially immediately increased by 4V (e.g., from 4V to 8V), which corresponds to a 10 A correction in the combined PWM current $I_{PWM}$ delivered by the PWM controlled switches 1-3.

In this example, the process of the second plot 228 repeats 8 times as the bus current $I_{BUS}$ increases from 20 A to 90 A. At 90 A, all of the PWR switches 1-8 deliver the combined PWR current $I_{PWR}$ to the electrical bus 104. For load currents between 90 A and 110 A, the PWM controlled switches 1-3 continue to deliver additional current to the electrical bus 104 until all of the coupling lines SA1-SA8 coupled to the power sources 108 (e.g., solar array strings) are delivering full current to the electrical bus 104. In this manner, the power sources 108 deliver the bus current $I_{BUS}$ required to substantially match the load 122 on the electrical bus 104. Each of the PWM controlled switches 1-3 thereby provides power from the power sources 108 to the electrical bus 104 at a controlled current and/or a controlled voltage as mentioned above.

Figure 3:
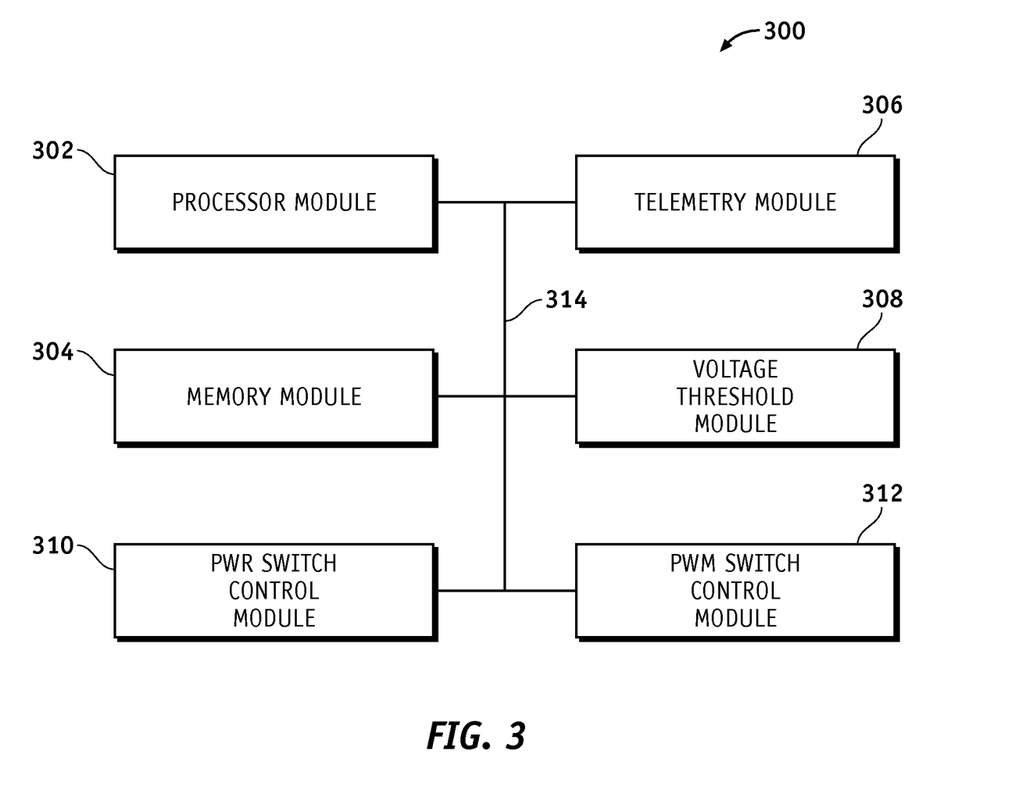
FIG. 3 is an illustration of an exemplary functional block diagram of the controller of FIG. 1 according to an embodiment of the disclosure.

FIG. 3 is an illustration of an exemplary functional block diagram (system 300) of the controller 102 of FIG. 1 according to an embodiment of the disclosure. The system 300 generally comprises a processor module 302, a memory module 304, a telemetry module 306, a voltage threshold module 308, the PWR switch control module 310, and a PWM switch control module 312. These modules may be coupled to and communicate with each other via a network bus 314.

The processor module 302 comprises processing logic that is configured to carry out the functions, techniques, and processing tasks associated with the operation of the system 300. In particular, the processing logic is configured to support the system 300 described herein. For example, the processor module 302 may receive signals such as the bus voltage signal 106, the PWR SW status signal 112, and the power source telemetry (SA TM) signal 116 from the system 100 and send these signals to the telemetry module 306, and the like.

For another example, the processor module 302 may control discrete amounts of a subset of currents as well as analog amounts of another subset of currents from the power sources 108 to substantially match a sum of these subsets of the currents to the load 122 on the electrical bus 104 as explained in more detail below in the context of discussion of FIG. 5. Further, the processor module 302 accesses the memory module 304 such as access to the bus reference voltage signal 110, voltage thresholds, and the like.

The processor module 302 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein.

In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

The memory module 304 may be a data storage area with memory formatted to support the operation of the system 300. The memory module 304 is configured to store, maintain, and provide data as needed to support the functionality of the system 300 in the manner described below. The data may comprise, for example but without limitation, the voltage error signal 202, the bus reference voltage signal 110, voltage thresholds, and the like. In practical embodiments, the memory module 304 may comprise, for example but without limitation, a non-volatile storage device (non-volatile semiconductor memory, hard disk device, optical disk device, and the like), a random access storage device (for example, SRAM, DRAM), or any other form of storage medium known in the art.

The memory module 304 may be coupled to the processor module 302 and configured to store, for example but without limitation, a database, and the like. Additionally, the memory module 304 may represent a dynamically updating database containing a table for updating the database, and the like. The memory module 304 may also store, a computer program that is executed by the processor module 302, an operating system, an application program, tentative data used in executing a program, and the like.

The memory module 304 may be coupled to the processor module 302 such that the processor module 302 can read information from and write information to the memory module 304. As an example, the processor module 302 and memory module 304 may reside in respective application specific integrated circuits (ASICs). The memory module 304 may also be integrated into the processor module 302. In an embodiment, the memory module 304 may comprise a cache memory for storing temporary variables or other intermediate information during execution of instructions to be executed by the processor module 302.

The telemetry module 306 receives the bus voltage signal 106, the PWR switch status signal 112, and the power source telemetry (SA TM) signal 116. The bus voltage signal 106 is compared to the bus reference voltage signal 110, and the voltage error signal 202 comprising a difference between the bus voltage signal 106 and the bus reference voltage signal 110 is computed.

The voltage threshold module 308 compares the voltage error signal 202 to a sequence of voltage thresholds, and directs the PWR switch control module 310 to activate PWR switches 1-8 until the voltage error signal 202 causes the current delivered to the electrical bus 104 to be equal to the load current. The sequence of voltage thresholds may comprise, for example but without limitation, 2V, 3V, 4V, 5V, 6V, 7V, 8V, 9V, and the like.

The PWR switch control module 310 controls and drives the PWR switches 1-8 via the PWR SW drive 114 (FIG. 1).

The PWM switch control module 312 monitors the PWR SW status signal 112 of the PWR switches 1-8 and generates the analog PWM error signal 118 which is proportional to a current delivered to the electrical bus 104 by the PWM controlled switches 1-3. The PWR SW status signal 112 is subtracted from the voltage error signal 202 to produce the analog PWM error signal 118 to control an amount of current delivered by the PWM controlled switches 1-3. As explained above, each time one of the power sources 108 such as a solar array string is coupled to the electrical bus 104 or decoupled from the electrical bus 104 and shunted to ground 120 by the PWM switch control module 312, the analog PWM error signal 118 coupled to the PWM controlled switches 1-3 may need to be re-centered. The analog PWM error signal 118 is re-centered to control the PWM controlled switches 1-3 to deliver extra current required to support the load 122 (FIG. 1) on the electrical bus 104.

Figure 4:
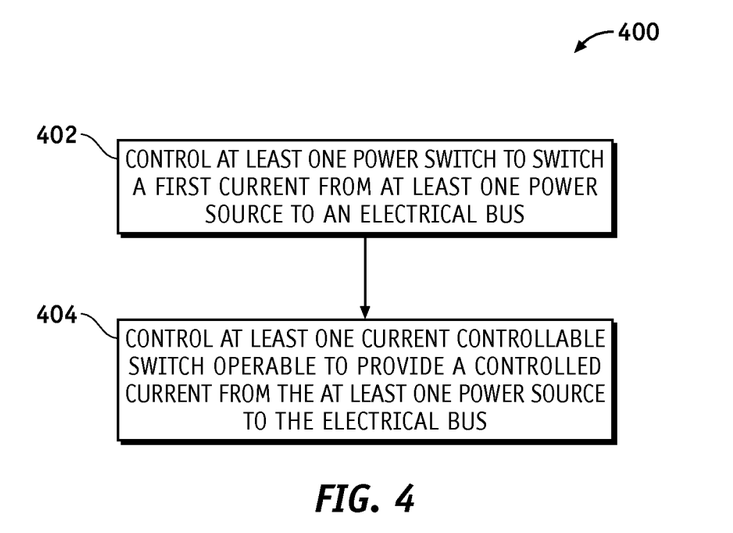
FIG. 4 is an illustration of an exemplary flowchart showing a PWM controlled sequential shunt regulation process according to an embodiment of the disclosure.

FIG. 4 is an illustration of an exemplary flowchart showing a sequential shunt regulation process 400 according to an embodiment of the disclosure. The various tasks performed in connection with the process 400 may be performed mechanically, by software, hardware, firmware, or any combination thereof. It should be appreciated that process 400 may include any number of additional or alternative tasks, the tasks shown in FIG. 4 need not be performed in the illustrated order, and the process 400 may be incorporated into a more comprehensive procedure or process having additional functionality not described in detail herein.

For illustrative purposes, the following description of process 400 may refer to elements mentioned above in connection with FIGS. 1 and 3. In practical embodiments, portions of the process 400 may be performed by different elements of the systems 100 and 300 such as: the controller 102, the electrical bus 104, the PWM controlled switches 1-3, the power switches (PWR switch 1-8), the coupling lines (SA1-SA11), etc. The process 400 may have functions, material, and structures that are similar to the embodiments shown in FIGS. 1 and 3. Therefore common features, functions, and elements may not be redundantly described here.

Process 400 may begin by controlling at least one power switch such as at least one of the PWR switches 1-8 to switch a first current from at least one of the power sources 108 to the electrical bus 104 (task 402).

Process 400 may continue by controlling at least one current controllable switch such as the PWM controlled switches 1-3 operable to provide a controlled current from the at least one of the power sources 108 to the electrical bus 104 (task 404).

Figure 5:
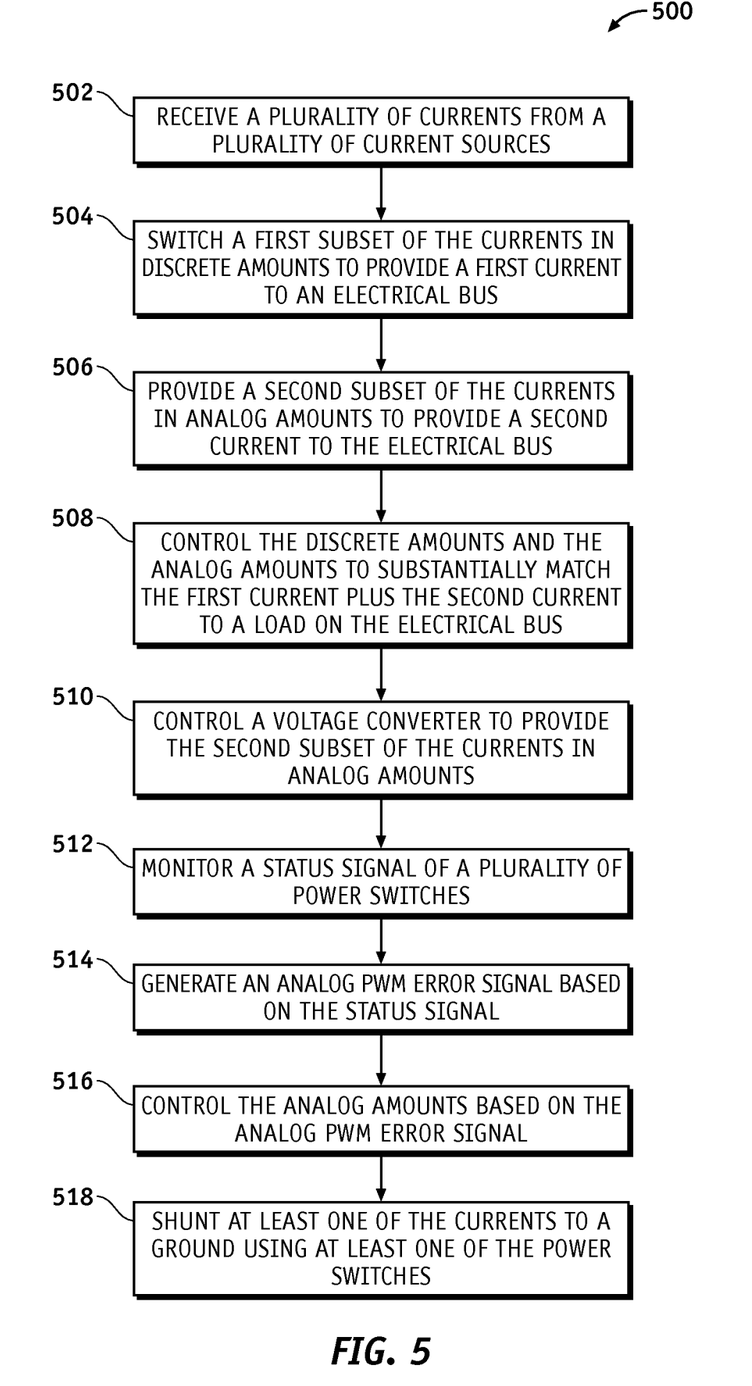
FIG. 5 is an illustration of an exemplary flowchart showing an electrical system regulation process using a PWM controlled sequential shunt regulator with analog fill control according to an embodiment of the disclosure.

FIG. 5 is an illustration of an exemplary flowchart showing an electrical system regulation process 500 using a sequential shunt regulator with analog fill control according to an embodiment of the disclosure. The various tasks performed in connection with process 500 may be performed mechanically, by software, hardware, firmware, or any combination thereof. It should be appreciated that process 500 may include any number of additional or alternative tasks, the tasks shown in FIG. 5 need not be performed in the illustrated order, and the process 500 may be incorporated into a more comprehensive procedure or process having additional functionality not described in detail herein.

For illustrative purposes, the following description of process 500 may refer to elements mentioned above in connection with FIGS. 1 and 3. In practical embodiments, portions of the process 500 may be performed by different elements of the system 100 and 300 such as: the controller 102, the electrical bus 104, the PWM controlled switches 1-3, the plurality of power switches (PWR switch 1-8), the plurality of coupling lines (SA1-SA11), etc. The process 500 may have functions, material, and structures that are similar to the embodiments shown in FIGS. 1 and 3. Therefore common features, functions, and elements may not be redundantly described here.

Process 500 may begin by receiving a plurality of currents from a plurality of current sources such as the power sources 108 (task 502).

Process 500 may continue by switching a first subset of the currents in discrete amounts to provide a first current such as the combined PWR current $I_{PWR}$ to the electrical bus 104 (task 504). The first subset of currents may comprise, for example but without limitation, currents provided by a first percentage of the power sources 108 (e.g., a solar panel or a solar array string) that are sequentially coupled via respective coupling lines SA1-SA8 to the electrical bus 104 as a function of the load current of the load 122. For example but without limitation, the first subset may comprise currents from a first and a second solar array string each having 10 A current and coupled to the electrical bus 104 via the SA1 and SA2 coupling lines respectively.

In this example, the discrete amounts corresponding to the first current comprise 2×10 A=20 A with the PWR SW status signal 112 corresponding to 00111111 in bit notation. In the bit notation, a 0 indicates a switch providing current to the electrical bus 104, and a 1 indicates a switch not providing current to the electrical bus 104. Thus, 00111111 indicates PWR switches 1-2 are providing current to the electrical bus 104, and PWR switches 3-8 are not providing current to the electrical bus 104

Process 500 may continue by providing a second subset of the currents in analog amounts to provide a second current (e.g., the combined PWM current $I_{PWM}$) to the electrical bus 104 (task 506). The second subset may comprise, for example but without limitation, currents provided by a second percentage of the power sources 108 that are simultaneously coupled via respective SA9-SA11 coupling lines to the electrical bus 104 as a function of the load current. For example but without limitation, the second subset may comprise currents from a first, a second and a third solar array string each having 10 A current and coupled to the electrical bus 104 via the SA9, SA10, and SA11 coupling lines respectively.

By operating the PWM switches at approximately 50%, the analog amounts of the second current flowing to and received at the electrical bus 104 may comprise 3*5 A=15 A. In this example, the PWR switches 1-2 coupled to the first percentage of the power sources 108 deliver the first current in discrete amounts comprising 20 A to the electrical bus 104. Also in this example, the PWM controlled switches 1-3 coupled to the second percentage of the power sources 108 deliver the second current in analog amounts comprising 15 A to the electrical bus 104. Thus in this example, a total current such as the bus current $I_{BUS}$ delivered to the electrical bus 104 is 35 A.

If the load current of the load 122 on the electrical bus 104 is increased to 39 A, the controller 102 would increase a duty cycle of the PWM controlled switches 1-3 to increase the second current to 19 A. Similarly, if the load current is increased to 41 A, then the controller 102 would command an additional power switch from the PWR switches 1-8 to release an additional power source from the power sources 108 to increase the first current to 30 A, and the controller 102 would decrease a duty cycle of the PWM controlled switches 1-3 to decrease the second current to 11 A.

Process 500 may continue by the controller 102 controlling the discrete amounts and the analog amounts to substantially match the first current plus the second current to the load 122 on the electrical bus 104 (task 508). For example, as mentioned above, if the load current of the load 122 increases from 35 A to 39 A, the controller 102 controls the PWM controlled switches 1-3 to increase a duty cycle thereof to supply 19 A of the analog amounts to the electrical bus 104. In this manner, the bus current $I_{BUS}$ comprises 19 A of the analog amounts plus 20 A of the discrete amounts supplied from two power sources (2×10 A=20 A), which substantially matches a load current of 39 A.

From the above example, if the load current increases from 35 A to 41 A, then the controller 102 controls the PWR switches 1-8 to release an additional power source from the power sources 108 providing the first current comprising 30 A of the discrete amounts from three power sources via respective coupling lines SA1-SA8 thereof to the electrical bus 104. Thus in the above example, the second current delivered by the PWM controlled switches 1-3 from coupling lines SA9-SA11 decreases to 11 A of the analog amounts accordingly. In this manner, for this example, the bus current $I_{BUS}$ comprises the first current comprising 30 A of the discrete amounts supplied from three power sources (3×10 A=30 A) plus the second current comprising 11 A of the analog amounts, which substantially matches the load current of 41 A.

Process 500 may continue by the controller 102 controlling a controllable voltage converter such as one of the PWM controlled switches 1-3 to provide the second subset of the currents in analog amounts (task 510). The voltage converter may comprise, for example but without limitation, a controllable voltage converter, a controllable boost converter, a controllable buck converter, at least one controllable voltage converter comprising at least one controllable boost converter, and the like.

Process 500 may continue by the controller 102 monitoring the status signal 112 (PWR SW status signal 112) of the power switches (PWR switch 1-8) (task 512).

Process 500 may continue by the controller 102 generating the analog PWM error signal 118 based on the status signal 112 (PWR SW status signal 112) (task 514).

Process 500 may continue by the controller 102 controlling the analog amounts based on the analog PWM error signal 118 (task 516). The analog PWM error signal 118 may be proportional to a current delivered from the power sources 108 (current sources) to the electrical bus 104. As explained above, the PWR SW status signal 112 may be subtracted from the voltage error signal 202 to produce the analog PWM error signal 118.

Process 500 may continue by the controller 102 shunting at least one of the currents to the ground 120 by at least one of the power switches (PWR switch 1-8) (task 518).

In this way, embodiments of the disclosure provide voltage regulation for a system of power sources such as the power sources 108 switched to a load such as the load 122 on the electrical bus 104.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1 and 3 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The invention claimed is:

1. A sequential shunt regulator comprising:
   at least one power switch operable to switch a first subset of current from at least one power source in discrete amounts to provide a first current to an electrical bus;
   at least one current controllable switch operable to provide a second subset of the current from the at least one power source in analog amounts to provide a second current to the electrical bus; and a controller operable to:
control the at least one power switch and the at least one current controllable switch to control the discrete amounts and the analog amounts to substantially match the first current plus the second current to a load on the electrical bus;
monitor a status signal of the at least one power switch, the status signal comprising an on or off signal indicating whether the at least one power switch is or is not providing current to the electrical bus;
generate an analog PWM error signal based on the status signal; and control the analog amounts based on the analog PWM error signal.

2. The sequential shunt regulator according to claim 1, wherein the at least one power switch is further operable to shunt the current to a ground.

3. The sequential shunt regulator according to claim 1, wherein the at least one current controllable switch comprises at least one controllable voltage converter.

4. The sequential shunt regulator according to claim 3, wherein the at least one controllable voltage converter comprises at least one controllable boost converter.

5. The sequential shunt regulator according to claim 1, further comprising the at least one power source.

6. The sequential shunt regulator according to claim 1, further comprising the electrical bus.

7. The sequential shunt regulator according to claim 1, wherein the at least one power source comprises at least one solar panel.

8. A sequential shunt regulation method, the method comprising:
controlling at least one power switch to switch a first current from at least one power source to an electrical bus; and
controlling at least one current controllable switch operable to provide a controlled current from the at least one power source to the electrical bus;
receiving a plurality of currents from the at least one power source comprising a plurality of current sources;
switching a first subset of the currents in discrete amounts to provide the first current to the electrical bus;
providing a second subset of the currents in analog amounts to provide a second current to the electrical bus;
controlling the discrete amounts and the analog amounts to substantially match a sum of the first current and the second current to a load on the electrical bus;
monitor a status signal of the at least one power switch, the status signal comprising an on or off signal indicating whether the at least one power switch is or is not providing current to the electrical bus;
generating an analog PWM error signal based on the status signal; and
controlling the analog amounts based on the analog PWM error signal.

9. The method according to claim 8, wherein the at least one power switch is further operable to switch the first current to a ground.

10. The method according to claim 8, wherein the at least one current controllable switch comprises at least one controllable voltage converter.

11. The method according to claim 10, wherein the at least one controllable voltage converter comprises at least one controllable boost converter.

12. A method for regulating an electrical system using a sequential shunt regulator with analog fill control, the method comprising:
receiving a plurality of currents from a plurality of current sources;
switching a first subset of the currents in discrete amounts to provide a first current to an electrical bus;
providing a second subset of the currents in analog amounts to provide a second current to the electrical bus;
controlling the discrete amounts and the analog amounts to substantially match the first current plus the second current to a load on the electrical bus;
monitor a status signal of at least one power switch, the status signal comprising an on or off signal indicating whether the at least one power switch is or is not providing current to the electrical bus;
generating an analog PWM error signal based on the status signal; and
controlling the analog amounts based on the analog PWM error signal.

13. The method according to claim 12, wherein the current sources comprise at least one solar panel.

14. The method according to claim 12, further comprising controlling a voltage converter to provide the second subset of the currents in analog amounts.

15. The method according to claim 14, wherein the voltage converter comprises a controllable boost converter.

16. The method according to claim 12, wherein the analog PWM error signal is proportional to a current delivered from the current sources to the electrical bus.

17. The method according to claim 12, wherein the status signal is subtracted from a voltage error signal to produce the analog PWM error signal.

18. The method according to claim 12, further comprising shunting at least one of the currents to a ground using at least one of the power switches.

19. The sequential shunt regulator according to claim 1, wherein the analog PWM error signal proportional to a current delivered from the current sources to the electrical bus.

20. The sequential shunt regulator according to claim 1, wherein the status signal subtracted from a voltage error signal to produce the analog PWM error signal.

* * * * *